United States Patent Office 3,005,485
Patented Oct. 24, 1961

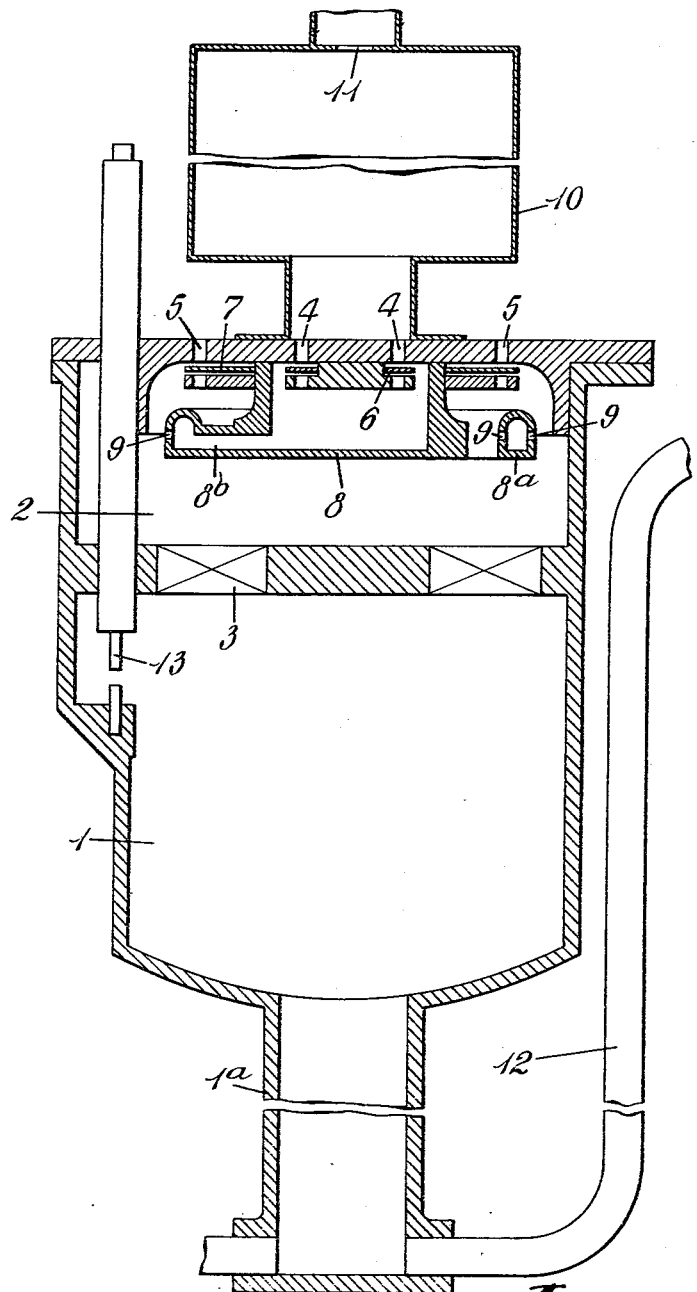

3,005,485
GASEOUS FUEL COMBUSTION APPARATUS
Leslie Salgo, Locusthill, Ontario, and John A. Kitchen, Markham, Ontario, Canada, assignors to Joseph Lucas (Industries) Limited, Birmingham, England
Filed Apr. 17, 1959, Ser. No. 807,071
Claims priority, application Great Britain May 7, 1958
1 Claim. (Cl. 158—7)

This invention relates to a gaseous fuel combustion apparatus of the so-called pulsating type, and of the kind comprising a combustion chamber, a mixing chamber having valve-controlled inlets for fuel gas and combustion air respectively, and a flame trap separating the two chambers.

The object of the invention is to provide such apparatus in a convenient form.

The invention consists of apparatus of the kind specified in which a gas diffuser is mounted in the mixing chamber in association with the fuel gas inlet, said diffuser including an annular ring in which are formed holes for the admission of fuel gas to the mixing chamber.

The accompanying drawing is a sectional view of an example of the invention in which there is provided a combustion chamber 1 of cylindrical form. At one end of the chamber 1, is a mixing chamber 2 which is separated from the combustion chamber by a flame trap 3, the latter being conveniently constructed from a spirally coiled metal strip the convolutions of which are separated by corrugations on the strip.

In the end wall of the mixing chamber 2 remote from the flame trap are formed an inner annularly arranged row of fuel gas inlets 4, and an outer annularly arranged concentric row of combustion air inlets 5. Moreover, within the mixing chamber are mounted a pair of concentrically arranged annular valve closure members 6, 7 for co-operation respectively with the fuel gas inlets, and the combustion air inlets. The valve closure member 6 is disposed within a central cylindrical chamber of a gas diffuser 8 contained in the mixing chamber. This central chamber is in communication with the interior of a concentric annular hollow ring 8ª through radially disposed tubes 8ᵇ. The diffuser therefore, has the form of a wheel of which the central chamber constitutes the hub, whilst the radial tubes and hollow ring form the spokes and rim respectively. In both the outer and inner peripheries of the hollow ring 8ª are formed holes 9 through which the fuel gas is fed to the mixing chamber, these holes being disposed to admit the fuel gas into the air stream from the air inlets 5.

To the outer side of the end wall of the mixing chamber and in communication with the fuel gas inlets 4 is a fuel gas cushioning chamber 10 having a restricted orifice 11 through which the fuel gas is supplied thereto.

At the end of the combustion chamber remote from the flame trap is a cylindrical tubular extension 1ª of reduced diameter, and to the outer end of this extension are connected tubes 12 through which the combustion products can pass to the apparatus to be heated.

When the apparatus is in action air entering the mixing chamber in a direction parallel with the axis of the chamber meets the fuel gas flowing radially from the hollow tube 8ª to form a combustible mixture. This mixture passes through the flame trap 3 to the combustion chamber where it is ignited by an electric spark plug 13, the resulting flame being prevented by the trap 3 from spreading to the mixing chamber.

In other respects the mode of the action of the apparatus is similar to other forms of apparatus of the pulsating type, the valve closure members being intermittently closed by the pressure pulses generated in the combustion chamber.

Having thus described our invention what we claim as new and desire to secure by Letters Patent is:

A gaseous fuel combustion apparatus comprising in combination a combustion chamber, a mixing chamber situated at one end of said combustion chamber, a flame trap situated between said combustion chamber and mixing chamber, fuel gas inlet valve means provided at the end of said mixing chamber remote from said combustion chamber, combustion air inlet valve means of annular form provided at the same end of said mixing chamber as said fuel gas inlet valve means and surrounding the latter, both of said valve means being intermittently closable by pressure pulses generated in said combustion chamber, and a gas diffuser which is mounted in said mixing chamber, and which has a central chamber enclosing said fuel gas inlet valve means, an annular hollow part surrounding and spaced from said central chamber, and passages establishing communication between said central chamber and the interior of said annular hollow part, the latter being provided with holes in its inner and outer peripheral portions for directing fuel gas from said diffuser into the path of the combustion air flowing through said mixing chamber from said combustion air inlet valve means to said combustion chamber.

References Cited in the file of this patent
UNITED STATES PATENTS

| | | |
|---|---|---|
| 663,560 | Colver | Dec. 11, 1900 |
| 2,601,242 | Bonvillian et al. | June 24, 1952 |
| 2,898,978 | Kitchen et al. | Aug. 11, 1959 |

FOREIGN PATENTS

| | | |
|---|---|---|
| 818,243 | France | June 14, 1937 |
| 288,880 | Germany | Feb. 7, 1914 |